(12) United States Patent
Butler et al.

(10) Patent No.: US 8,462,177 B2
(45) Date of Patent: Jun. 11, 2013

(54) SYSTEMS AND METHODS FOR PROVIDING CONTENT FOR USE IN MULTIPLE ENVIRONMENTS

(75) Inventors: Dominic Butler, Kent (GB); Jon Wallace, Middlesex (GB); James Mullholland, London (GB)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/595,948

(22) Filed: Aug. 27, 2012

(65) Prior Publication Data

US 2012/0320084 A1 Dec. 20, 2012

Related U.S. Application Data

(63) Continuation of application No. 12/330,966, filed on Dec. 9, 2008, now Pat. No. 8,274,529.

(51) Int. Cl.
*G09G 5/00* (2006.01)
*G06F 17/00* (2006.01)
*G06F 17/20* (2006.01)
*G06F 3/00* (2006.01)

(52) U.S. Cl.
USPC .............................. 345/619; 715/238; 725/44

(58) Field of Classification Search
USPC .............................. 345/619; 715/238; 725/44
See application file for complete search history.

(56) References Cited

U.S. PATENT DOCUMENTS

| | | | |
|---|---|---|---|
| 6,393,437 B1 | 5/2002 | Zinda et al. | |
| 6,615,192 B1 | 9/2003 | Tagawa et al. | |
| 6,654,506 B1 | 11/2003 | Luo et al. | |
| 6,804,682 B1 | 10/2004 | Kemper et al. | |
| 6,906,730 B2 | 6/2005 | Bossut et al. | |
| 6,940,526 B2 | 9/2005 | Noda et al. | |
| 7,091,974 B2 | 8/2006 | Masera et al. | |
| 7,133,050 B2 | 11/2006 | Schowtka | |
| 7,180,528 B2 | 2/2007 | Bossut et al. | |
| 7,265,763 B2 | 9/2007 | Bossut et al. | |
| 7,386,834 B2 | 6/2008 | Van De Vanter et al. | |
| 7,503,034 B2 | 3/2009 | Berg et al. | |
| 7,506,342 B2 | 3/2009 | Mousseau et al. | |
| 7,530,079 B2 | 5/2009 | Stubbs et al. | |
| 7,644,390 B2 | 1/2010 | Khodabandehloo et al. | |
| 7,647,588 B2 | 1/2010 | Cyphers | |

(Continued)

OTHER PUBLICATIONS

Apache Subversion Features, available at http://subversion.apache.org/features.html (last accessed Nov. 2, 2010).

(Continued)

*Primary Examiner* — Ryan R Yang
(74) *Attorney, Agent, or Firm* — Kilpatrick Townsend & Stockton LLP (57) ABSTRACT

Systems and methods for using design and/or constraint information in selecting, editing, creating, and managing content for multiple operating environments. For example, an image editor feature of a content management system can receive constraints and/or design requirements identifying specific image sizes that are needed for offering a piece of content on one or more operating environments. This information may be used to guide or restrict a user to select appropriate image portions. A selection marquee, sized based on the constraint information, may be positioned on a displayed image to select an image portion to use for that particular image requirement. The marquee size enforces the image constraint. Design and constraint information may also be used to inform selection, editing, and creation of other constraints and other types of assets, including, but not limited to, text and video assets.

20 Claims, 6 Drawing Sheets

U.S. PATENT DOCUMENTS

| | | | |
|---|---|---|---|
| 7,675,528 | B2 | 3/2010 | Walker et al. |
| 7,683,916 | B2 | 3/2010 | Bossut et al. |
| 7,730,035 | B2 | 6/2010 | Berger et al. |
| 2002/0165883 | A1 | 11/2002 | Sans et al. |
| 2004/0257380 | A1 | 12/2004 | Herber et al. |
| 2005/0044531 | A1 | 2/2005 | Chawla et al. |
| 2007/0101256 | A1 | 5/2007 | Simonyi |

OTHER PUBLICATIONS

Subversion 1.5 Features, available at http://subversion.apache.org/docs/release-notes/1.5.html (last accessed Nov. 2, 2010).

Brambley, Unpublished U.S. Appl. No. 12/270,341, filed Nov. 13, 2008.

Butler, Unpublished U.S. Appl. No. 12/330,966, filed Dec. 9, 2008.

Adobe Systems Incorporated, "Adobe Device Central CS3 Mobilizes Creative Pros," Mar. 27, 2007.

"Subversion: Subversion Features," http://subversion, tigris.org/features.html 3 pages, downloaded from the Internet on Nov. 3, 2008.

"Subversion: Subversion 1.5 Release Notes," http://subversion.tigris.org/svn_1.5_releasenotes.html 17 pages, downloaded from the Internet on Nov. 3, 2008.

Apple, Inc., "Working wih Xcode: Building Applications for the Future", published online; [retrieved on Jan. 3, 2012]; Retrieved from NPLs fo application 11/470,863 (now PN. 7,530,079 B2), 2006, pages 1-8.

Arm Limited, "ARM Developer Suite Version 1.2 CodeWarrier IDE Guide", published online; [retrieved on Jan. 3, 2012], Retrieved from Internet <URL:http://www.cis.gvsu.edu/- wolffe/courses/cs459/docs/ADS_CodeWarrierIDEGuide.pdf, 2001, pp. 1-464.

Gracia, et al., "A Double-Model Approach to Achieve Effective Model-View Separation in Template Based Web Applications", Springer-Verlag Berlin Heidelberg; [retrieved on Jan. 4, 2012]; Retrieved from Internet, <URL:http://www.yeastemplates.org/articles/JST-ICWE2007.pdf, 2007, pp. 442-456.

Szczur, "TAE Plus: Transportable Applicatins Environment Plus: A User Interface Development Environment", ACM, [retrieved on Jan. 3, 2012]; Retrieved from Internet <URL:http://dl.acm.org/citation.cfm?id=151509>, 1993, pp. 76-101.

Tanaka, et al., "Live Document Framework for Re-editing and Redistributing Contents in WWW", [retrieved on Jan. 5, 2012]; Retrieved from Internet <URL:http;l/km.meme.hokudai.ac.jp/people/itok/work/pdf/Tanakaltok-EJC-2002.pdf>, 2002, pp. 1-18.

Notice of Allowance in Related U.S. Appl. No. 12/330,966, dated May 17, 2012, 11 pages.

SYSTEMS AND METHODS FOR PROVIDING CONTENT FOR USE IN MULTIPLE ENVIRONMENTS

CROSS-REFERENCE TO RELATED APPLICATION

This application is a continuation application of U.S. patent application Ser. No. 12/330,966 filed on Dec. 9, 2008, allowed, the contents of which are incorporated herein by reference in their entirety.

FIELD

The present disclosure relates generally to developing computer software applications and content and specifically to applications used for such development.

BACKGROUND

Content providers often make content available on different operating environments, such as through a general purpose webpage, on television, and on small mobile electronic devices. Doing so presents various challenges. For example, a content provider may provide a news story on a general website and to mobile device users. A photograph suitable for use on the general website may be too large for use on mobile devices upon which relevant details of the photograph are lost. Simply scaling the image down may not address the problem. For example, an image of a football team that is scaled down to the size of a thumbnail may be undesirable because relevant details are not recognizable. Thus, it is often desirable to create different versions of content specifically for each operating environment on which the content will be offered. Unfortunately, doing so can require creating and managing multiple sets of assets for these different operating environments, significantly increasing the complexity and expense of offering the content.

Making content available on mobile devices presents specific challenges. For example, a channel format may be used to provide content on mobile devices in which the channel format remains constant while the content presented within it changes over time. An exemplary channel may have a list of periodically updated news items in which the content of each news item is presented in a consistent container (such as, for example, according to an image place holder and a text placeholder) that provides a consistent news item format. Each time a new news item is published, an item rendered may put an image in an image placeholder space and fill a text field with the text. Generally, a channel format may be developed to include such containers and then deployed onto a content server where it is merged periodically with content provided by a content provider that is then made available to mobile devices on the channel.

A content provider may use a content management application with various content authoring features, such as an image, video, and text editing features. For example, to create a story, a journalist may enter a story into various fields of a content management tool, such as, for example, fields for a short headline, long headline, body text, and use a photo editor to add one or more images. In many cases, content is created primarily for print or web and then this content is scaled or otherwise manipulated programmatically for use on other operating environments. Unfortunately, journalists and other content providers are not constrained or guided with respect to the content they provide and have no easy way of selecting appropriate content for a given operating environment, such as, for example, for a given channel format. It is also often difficult to ensure or test that the content will appear as intended, especially in the context of television and mobile operating environments. In the case of channel content, after the initial design and authoring of the channel format, content providers are often not aware of the appearance of their content in the channel on a day-to-day basis without looking at the actual channel on a targeted device.

For various reasons, content received at a content server for a given operating environment does not always have the appearance intended by a provider. The content experience is often not as good as the provider would like especially on operating environments, such as on a mobile device, for which the content was not originally created. A developer may attempt to manage this deficiency by providing additional code to address non-conforming assets, for example, by resizing images, removing, truncating, and adding text, and/or requiring manual revision of content/format. These techniques frequently are insufficient. Truncating text, for example, can be very damaging to the meaning of the text's message. Similarly, text that is too short and fails to fill up the available space creates undesirable whitespace that is difficult to remedy effectively. Moreover, generally, the only content restrictions and guidance placed on content providers to help them provide content that is appropriate for a given operating environment are self imposed restrictions. While content providers could separately create content for each operating environment, doing so may significantly raise costs of providing the content. Accordingly, among other things, systems and methods that facilitate the creation and/or use of smarter, more efficient, and/or better informed and better restricted content for multiple operating environments are needed.

SUMMARY

Certain embodiments provide systems and methods for using design and/or constraint information in selecting, editing, creating, and managing content for multiple operating environments. Each such operating environment may present unique requirements because of differences with respect to access, processing, storage, display and other features. For example, a personal computer connected to the Internet through a high speed connection, a particular mobile computing device, and a high definition television each provide differing operating environments. In one exemplary embodiment, an image editor feature of a content management system can receive constraints and/or design requirements identifying specific image sizes that are needed for offering a piece of content on one or more operating environments. This information may be used to guide or restrict a content creator to select appropriate image portions for each environment. A selection marquee, sized based on the constraint information, may be positioned on a displayed image to select an image portion to use for that particular image requirement. The marquee size enforces the image constraint since it cannot be adjusted or can only be adjusted in accordance with the constraint. Design and constraint information may also be used to inform selection, editing, and creation of other constraints and other types of assets, including, but not limited to, text and video assets.

One exemplary embodiment is a method of determining image portions appropriate to use as assets in one or more versions of content being created for one or more receiving operating environments. The method comprises receiving constraint information relating to one or more images to be used in content provided on the one or more operating environments and providing an image portion selection tool for selecting a portion of an image satisfying one or more constraints for these particular operating environment(s). The method further comprises receiving a selection of an image portion and updating selected image portions information based on the selected image portion. Accordingly, appropriate image assets are identified for use in the content on the various operating environments upon which it will be offered.

Another exemplary embodiment comprises a method of using design information to determine and use constraints in selecting content assets for a piece of content to be offered on one or more different operating environments. The method comprises receiving design information relating to one or more operating environments such as information about a shape, size, or position attribute for one or more assets to be displayed when content is provided. The method further comprises using the design information to determine one or more constraints associated with an asset to be displayed in the content when the content is provided on an operating environment. The method may also comprise receiving an asset selection or modification of the asset that is restricted by the constraints and providing the asset for display in the content when the content is provided on the operating environment. The method may involve previewing the display of content for a particular operating environment to preview an asset selection made for the operating environment. The design information may be used to facilitate such previewing.

One exemplary system provides a content management system comprising a design analysis component, an asset selection component, and a publication component. A design analysis component may receive design information relating to operating environments on which content will be provided. A design analysis component may also use the design information to determine constraints associated with an asset to be displayed in the content when the content is provided on an operating environment. An asset selection component may receive an asset selection or modification of the asset that is restricted by the constraints associated with the asset. A publication component may provide the asset for display in the content for provision on one or more operating environments.

In other embodiments, a computer-readable medium (such as, for example, random access memory or a computer disk) comprises code for carrying out these methods and systems.

These embodiments are mentioned not to limit or define the invention, but to provide examples of embodiments to aid understanding thereof. Embodiments are discussed in the Detailed Description, and further description is provided there. Advantages offered by the various embodiments may be further understood by examining this specification.

BRIEF DESCRIPTION OF THE FIGURES

These and other features, aspects, and advantages are better understood when the following Detailed Description is read with reference to the accompanying drawings, wherein.

DETAILED DESCRIPTION

Certain embodiments facilitate publishing content on multiple operating environments. Certain embodiments provide an application that helps select and/or manage assets used for different operating environments. For example, one exemplary embodiment allows a user to select different portions of one or more master images to use for different versions of content being offered on different operating environments. For example, an image editor feature of a content management system can receive information about images needed for different versions of content. For example, the feature may receive one or more templates or other constraint information identifying several specific image sizes that are needed. The feature may use this information to guide the user to select appropriate images. For example, the feature may provide a view of a master image and one or more marquees sized based on the constraint information. The feature may allow the user to position each marquee on the master image to select an image to use for that particular image requirement. For example, a large marquee may be positioned so that it includes all of the players of a team photo master image, while a smaller marquee may be positioned so that it includes just a face of one of the players.

An exemplary content management system can manage these image selections and allow a user to preview the content that is being developed for a particular environment. For example, one of the selected images such as an image selected for a particular mobile device channel can be displayed in a preview screen with other assets, such as text, videos, and other images, selected for that operating environment. By receiving constraints related to one or more different operating environments on which content will be offered and/or providing the ability to preview content for different operating environments, the exemplary content management system facilitates selection of appropriate assets, such as images, texts, videos, for multiple operating environments and can save a significant amount of unnecessary effort while enhancing the quality of content offered for use on the different operating environments. A system such as the one described may enable content providers to effectively target multiple operating environments without substantially increasing their publishing costs.

This illustrative example is given to introduce the reader to the general subject matter discussed herein and certain benefits of certain embodiments. The disclosure is not limited to this example. The following sections describe various additional and alternative embodiments, examples, and benefits of various other methods and systems.

Illustrative System Configuration

Figure 1:
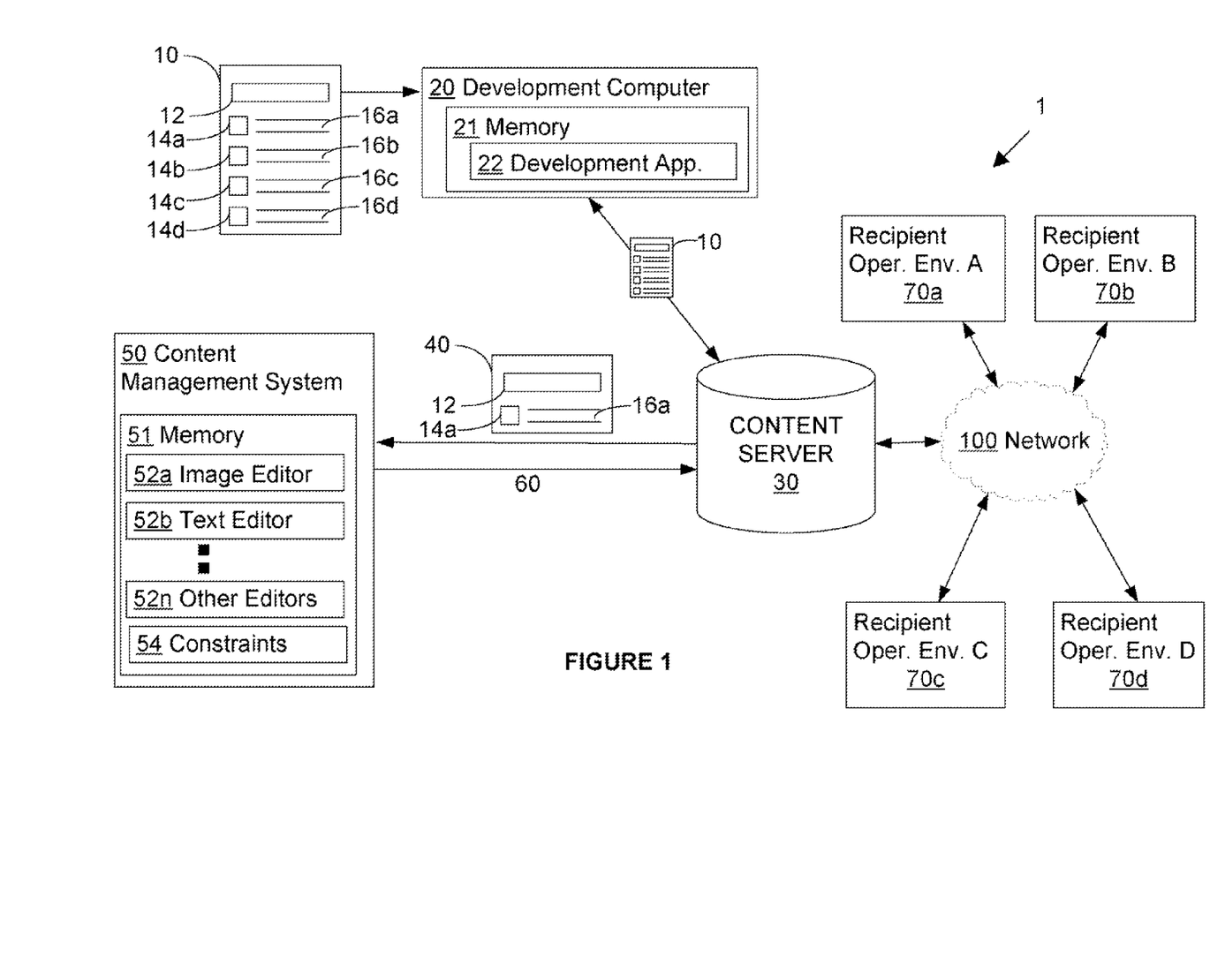
FIG. 1 is a system diagram illustrating design and development environments according to one embodiment.

FIG. 1 is a system diagram illustrating design and development environments according to one embodiment. Other embodiments may be utilized. The system 10 shown in FIG. 1 comprises various devices and a wired or wireless network 100. The devices 20, 30, 50, 70 each may comprise a computer-readable medium such as a random access memory (RAM), such as memory 21, 31, coupled to a processor that executes computer-executable program instructions stored in memory.

As shown in FIG. 1, a design 10 is developed on a development computer, for example, by a developer using a development application to implement an agreed upon design. The design 10 specifies characteristics for a piece of content. For example, the design may specify that a piece of content have a header 12 having a certain size and shape and then a series of repeated items 14, 16 forming a list, such as, for example, a list in which each item comprises a thumbnail size image and two lines of text. A first item comprises a first thumbnail image space 14a and space for two lines of text 16a, a second item comprises a second thumbnail image space 14b and space for two lines of text 16b, a third item comprises a third thumbnail image space 14c and space for two lines of text 16c, and a fourth item comprises a fourth thumbnail image space 14a and space for two lines of text 16d.

Assets used to create pieces of content according to this design must conform to the design's constraints. For example, the images provided for the thumbnail image spaces 14a-d must conform to the image space's shape and size. Similarly, the text provided for the text spaces 16a-16d must not exceed the allocated maximum (and/or minimum in some cases) number of characters.

The design 10 is sent from the development computer 20 to a content server 30. The content server 30 sends constraint information associated with the design for use on a content management system 50. The entire design 10 may be sent. Alternatively, less than all of the design may be provided to a content management system. For example, as shown in FIG. 1, repeated elements of a design may not be provided since constraints for repeated elements can be recognized from a single of instance of the repeated element. Here, constraint information 40 comprises information about the size and shape of header 12 and information about one list item 14a, 16a.

A content management system 50 can use the constraint information that it receives in a variety of ways. For example, the content management system may store the constraints 54 in memory and use them to facilitate content creation on an image editor 52a, a text editor, 53a, and other editors 52n. For example, an image editor 52a may use the constraints 54 to create image selection marquees used to select portions of an image or images.

The constraints 54 may also be used to preview content as it will appear according to the design 10. Thus, the content management system 50 may allow users to see what the content will look like within the design and make editorial choices based on this preview ability. Because the content is developed within the constraints 54 of the design, the design 10 does not need to include exception handling that it might otherwise require.

Content 60, including text, image, and video assets selected for use within the design 10, is developed according to the constraints 54 and sent to the content server 30 for publication. The content management system 50 may allow development of content that satisfies the requirements of multiple designs relevant to multiple content receiving operating environments. For example, a design may relate to a television operating environment, a second design may relate to a mobile device operating environment, a third design may relate to another mobile device operating environment, etc.

After developing content 60 for each of potentially many different operating environments, the content 60 is provided to the content server 60 for distribution, for example, through a network 100 to these various recipient operating environments 70a-d. This content does not necessarily have to be individual files. The content could comprise the coordinates of image marquees or other data that describes the individual images, and only one master copy of the source image may be required. There are numerous ways that this could be optimized to minimize file transfer traffic and address other content provision considerations.

The techniques for developing applications and the other features described herein have uses in a variety of contexts, not to be limited by the specific illustrations provided herein. The system shown in FIG. 1 is merely illustrative and is not intended to recite any system component or feature as essential or necessary to any embodiment.

Illustrative Embodiment of an Exemplary Content Management System

Figure 2:
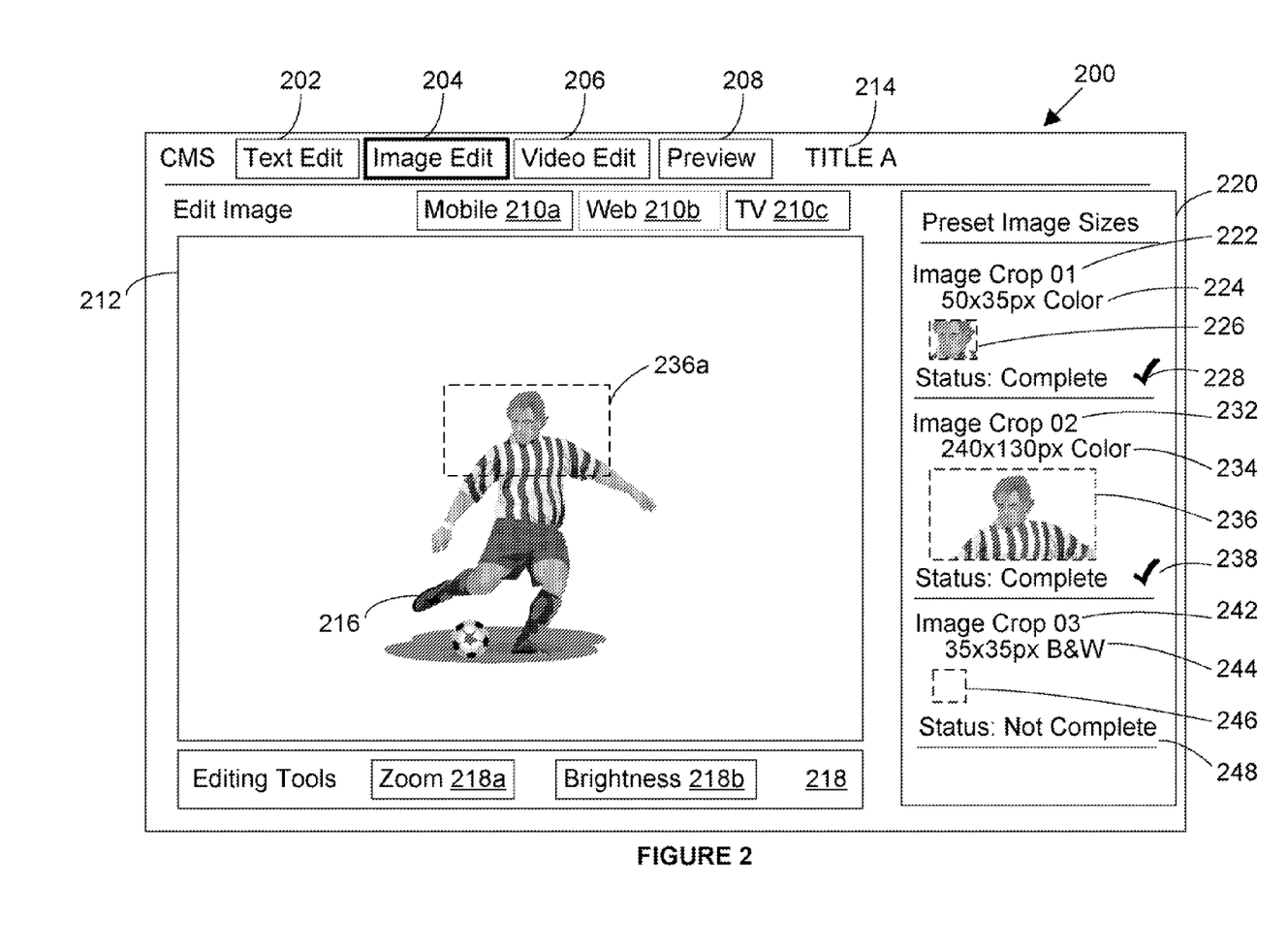
FIG. 2 illustrates an exemplary user interface of an exemplary content management system according to certain embodiments.

FIG. 2 illustrates an exemplary user interface 200 of an exemplary content management system according to certain embodiments. The content management system user interface 200 includes a text edit feature accessible by text edit button 202, an image edit feature accessible by image edit button 204, a video edit feature accessible by video edit button 206, a preview feature accessible by preview button 208, and displays a title for the job currently being managed, in this case, job "TITLE A." In FIG. 2, the user interface 200 presents aspects of the image edit feature and includes a mobile button 210a, a web button 210b, and a TV button for selecting a particular type of operating environment.

In FIG. 2, a picture 212 of a soccer player 216 is used as a master image in an image edit feature of the user interface 200 to create different images for different operating environments. The exemplary image edit feature of the user interface 200 include one or more editing tools 218, such as, as examples, a zoom tool 218a and a brightness tool 218b, for modifying or otherwise editing an image being displayed and used.

The exemplary image edit feature of the user interface 200 further includes a preset image sizes area 220. The preset image sizes area presents one or more preset image sizes that can (or must) be selected for one or more different operating environments upon which content will be offered. These preset image sizes may be determined by design and/or specific constraint information received at the content management system. For example, as shown in FIG. 1, a design or portion of a design 40 may be sent to a content management system 50 and used as or to identify constraints 54 used in selecting appropriate contents for a given operating environment's design.

In FIG. 2, a first image crop 222 labeled "Image Crop 01" includes constraints 224 that it have 50×35 pixels and be a color image. It also includes a marquee with an image that was selected in accordance with these constraints 224 and an indication 228 that the status of the selection of this image is complete. The image selected for this image crop may have been selected in a variety of ways. In one embodiment, a user of the image editing feature of the user interface 200 selects image marquee 226 and a selection marquee appears on the image 212 having a size and shape appropriate for the constraints 224. The user can position this marquee on the image 212 to select a portion of image 212 to use as the image crop 226 for "image crop 01."

As another example, a second image crop 232 labeled "Image Crop 02" includes constraints 234 that it have 240× 130 pixels and be a color image. It also includes a marquee 236 with an image that was selected in accordance with these constraints 234 and an indication 238 that the status of the selection of this image is complete. In this case, as shown in FIG. 2, a user has selected the marquee tool for selecting an image crop for "image crop 02" and has positioned the selection marquee 236a on a desired position on the image 212 to identify a portion of the image 212 displaying the soccer player's 216 head and shoulders. After making this selection, the status indicator 238 of "Image Crop 02" indicates that the selection of that image crop is complete.

As further illustrated in FIG. 2, a third image crop 242 labeled "Image Crop 03" includes constraints 244 that it have 35×35 pixels and be a black and white image. It also includes an empty marquee 246 in accordance with these constraints 234. Since no image has been selected for "Image Crop 03," an indication 248 indicates that the status of the selection of this image crop is not complete. In some cases, an image crop can comprise an entire image and image crops associated with the same content may be taken from different source images. For example, a first image crop may take a portion of a first image while a second image crop takes a portion of another image.

In certain embodiments, a content management system facilitates the use of an image to provide different images without requiring that these individual images be separately stored. For example, a content application may provide a table listing each professional soccer team in a professional soccer league and include an image of the club badge of each team. A master image of the badges of all the league teams could be used. The individual images of the table could be selected by selecting specific portions of the master image. This could avoid having to manage many individual files containing these individual images. Then if some or all of the clubs change their badges a single new file can be created. If the team badges are in the same position within the master image, no additional work is required to update the table with the new badges since the content will link to the appropriate coordinate positions within the updated master file.

Figure 5:
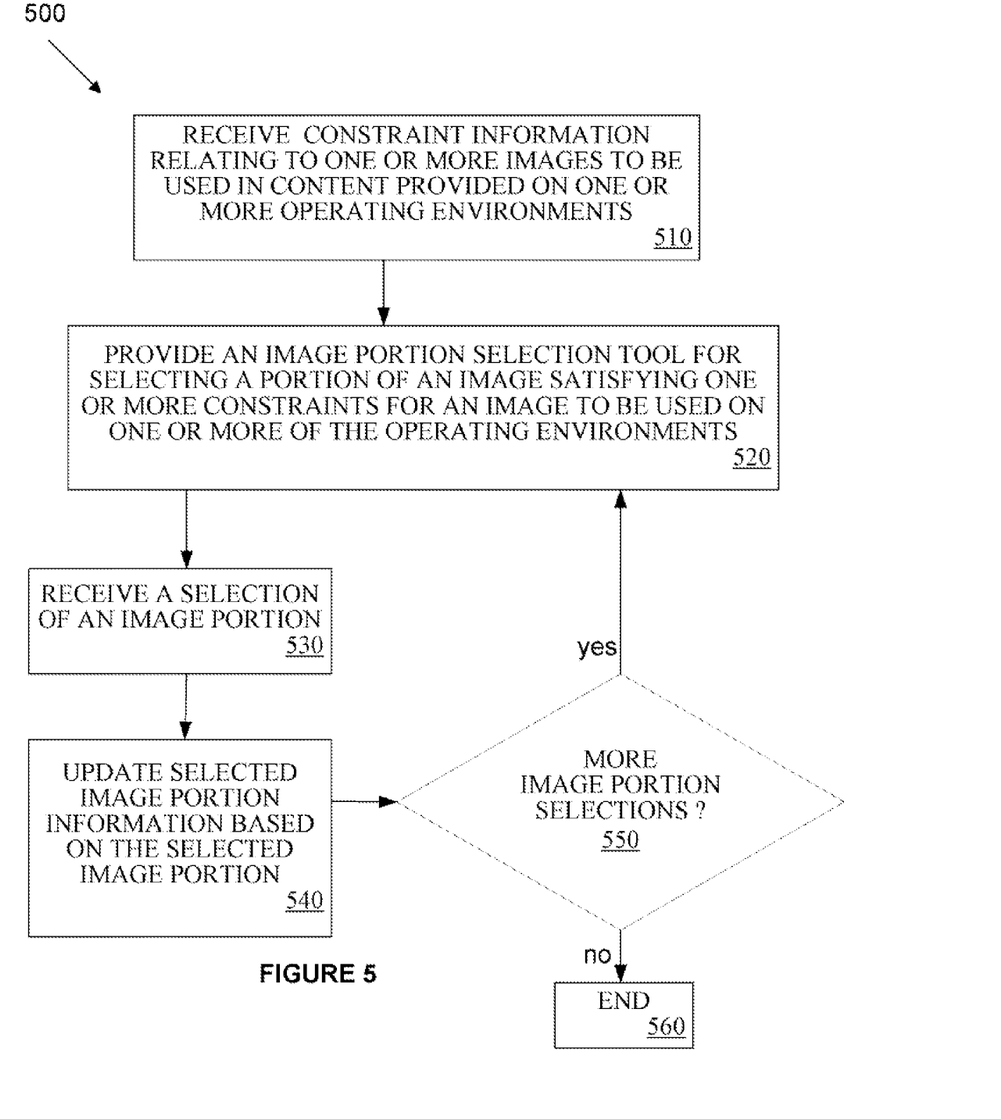
FIG. 5 illustrates an exemplary method of providing an image editing feature of a content management system according to certain embodiments.

FIG. 5 illustrates an exemplary method 500 of providing an image editing feature of a content management system according to certain embodiments. The method 500 comprises receiving constraint information relating to one or more images to be used in content provided on one or more operating environments, as shown in block 510. For example, a constraint may specify particular pixel dimensions for an image to be used on a particular operating environment.

The method 500 further comprises providing an image portion selection tool for selecting a portion of an image satisfying one or more constraints for an image of an operating environment, as shown in block 520. For example, an exemplary selection tool is a graphical selection marquee, such as a square rectangle or other shaped selector having a shape corresponding to the size and shape requirements specified by one or more image constraints. For example, if one or more particular mobile device operating environments require a 50 pixel by 50 pixel square image, the selection tool may provide a marquee of that size and shape that can be positioned on a displayed image to make a selection of a desired image portion. In certain embodiments, the selection tool is not graphical. For example, the selection tool may provide a means for a user to input coordinates of an image and see a representation of the image associated with the entered coordinates.

As shown in block 530, the method 500 further comprises receiving a selection of an image portion. For example, an image portion may be received after a user selects a portion of an image by positioning the image portion selection tool on the image. As another example, a selection may be received based on an automated or suggested placement of the selection tool. A selection may be modified or adjusted based on the receipt of edits or other adjustments.

As shown in block 540, the method 500 further comprises updating selected image portions based on the selected image portion. For example, a content management system may keep track of multiple image portion selections required in order to offer a piece of content on one or more operating environments. Upon the receipt of an image portion selection, information about the needed selections can be updated. If more selections are required or desired, as shown in block 550, the method 550 returns to block 520 where another image portion selection tool is provided for selecting another portion of the same or another image. If not more selections are required or desired, the method may end as shown in block 560.

A method such as exemplary method 500 may be used by a content provider in a variety of ways and to achieve a variety of benefits. For example, the content provider or content provider application may select appropriate images for a piece of content to be provided on multiple operating environments. Not all images may require or involve the use of a selection tool. For example, an entire image may be identified and used for a webpage operating environment while small portions of the image are selected and used for various mobile and other operating environments.

A content management application used to facilitate a method such as method 500 may involve presenting or otherwise organizing selections based on a job, where a single job refers to a particular use of a piece of content on a particular operating environment. Offering a piece of content may involve creating a series of jobs for different contexts, such as, as examples, one job for the general Internet, one job for a first mobile environment, one job for another mobile environment, one job for regular television, one job for high-definition television, etc. Each job may comprise a bundle of images, text, and other assets that may be managed by a content management system.

A job may correspond to a particular design such as design 10 of FIG. 1, having one or more placeholders for these types of assets that may be populated by a content management system. In some embodiments, a channel design provides a template for content that is periodically updated but presented consistently within the channel design format. A design, such as a channel design, may be used to provide the constraint information to a content management system. Generally, these constraints and other information about a design can be used to facilitate the provision of content by a content management system. For example, as illustrated in the method 500, constraint information can be used to determine an appropriate size image that needs to be selected to fill a particular image container of a design for one or more operating environments. Note that given a particular image size and shape, a user can select and modify a master image prior to making a selection to improve the appearance of the selected portion of an image. For example, an image may be zoomed in or out, scaled, or otherwise modified. As a particular example, method 500 may be used to select appropriate portions of an image for a piece of content related to soccer on different operating environments. Given an image of the entire team, a user may select the entire team image for one operating environment, and then zoom in and select the portion of the image showing a particular player's face for another operating environment.

Using constraint information in content management while content selection decisions are being made can facilitate such selections in a variety of ways and ensure that content ultimately has an appropriate or otherwise intended appearance on the various operating environments on which it will be offered. In certain embodiments, photo editing and/or photojournalism can be made more efficient, allowing convenient selection of different portions of one or more different source images and providing various editing functions, e.g., for zooming in and out on any particular image. Certain embodiments allow content authors to make sure that the content is right before pushing the content out for merger with a design with which it will be used. Rather than having to manually and often painstakingly manage the integration of non-conforming content, developers can focus on areas where their attention may be more appropriate or better spent, such as on the functional aspects of the application. Certain embodiments generally facilitate the creation and use of content templates and/or to offer content on different target operating environments by making it easier and cheaper for content providers to provide content in accordance with a content template.

Figure 3:
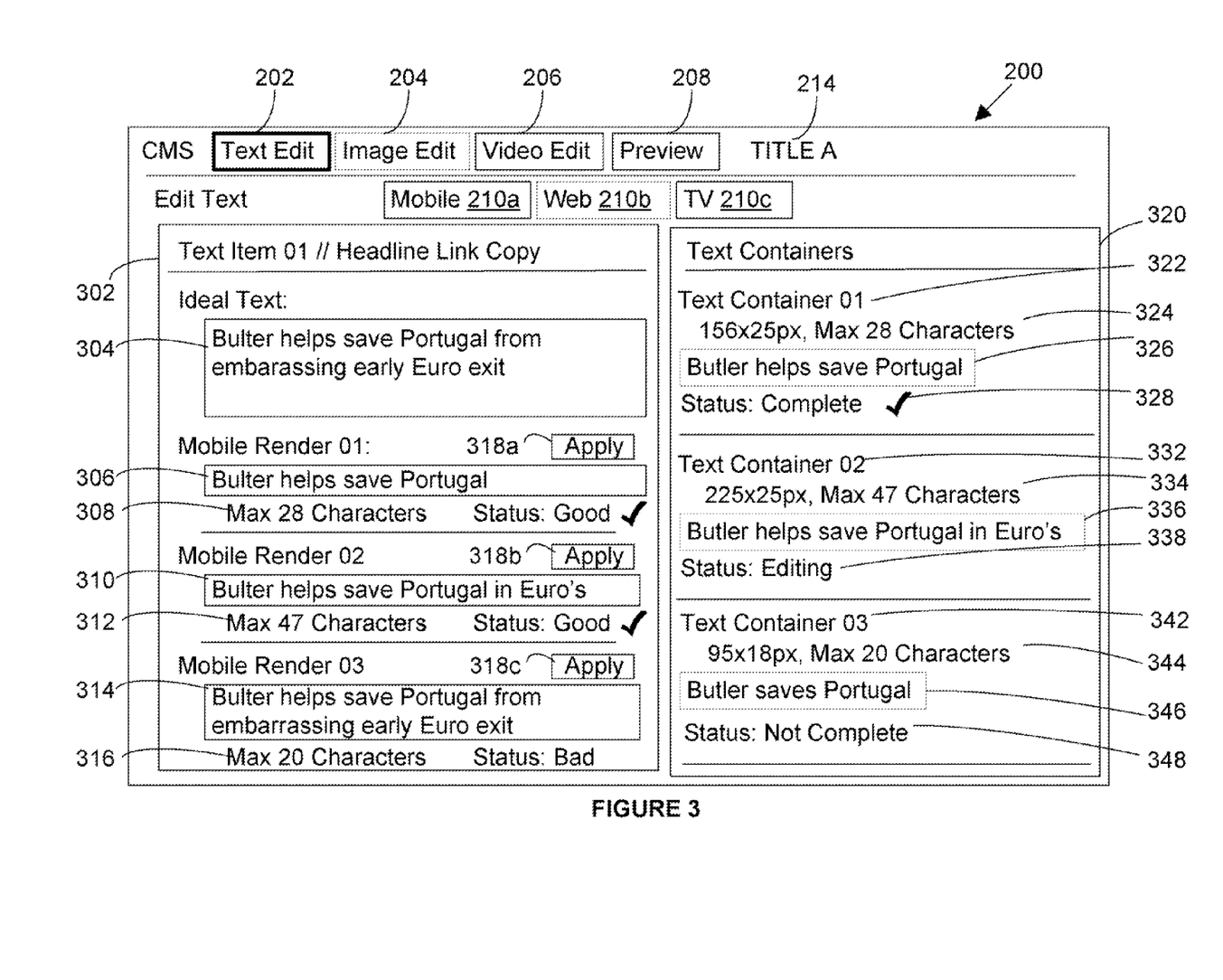
FIG. 3 illustrates another exemplary aspect of the user interface of FIG. 2 according to certain embodiments.

FIG. 3 illustrates another exemplary aspect of the user interface of FIG. 2 according to certain embodiments. In FIG. 3, the user interface 200 presents aspects of the text edit feature and a text selection area 302 and a text container area 320. The text selection area provides an area for a user to enter an ideal text string, that is, a text string that should ideally be used if there are no constraints imposed. In this example, the ideal text string reads "Butler helps save Portugal from embarrassing early Euro exit." The text selection area further includes several mobile render listings 306, 310, 314, each associated with constraint information 308, 312, 316, and an apply buttons 318a-c respectively. A text constraint may relate to the maximum/minimum number of characters and/or words, the format of the text, the size or other dimensional characteristic of the displayed text, and any other suitable characteristic by which a text entry may be constrained. For example, a headline may require a minimum number of characters to ensure that there is not too much white space following the headline.

In certain embodiments, suggested text is provided for each of the mobile render listings 306, 310, 314 based on a selection algorithm that determines an appropriate portion of the text based on the maximum characters allowed for a given render and various other rules. This allows a user to see, edit, and otherwise select an appropriate text string asset for a piece of content being offered on multiple mobile operating environments. The user may be able to compare the text provided on different operating environments to ensure that a consistent message is provided on different operating environments. The apply buttons 318a-c can be used to transfer the text being edited or otherwise selected in the mobile renderers 306, 310, 314 to one or more of the text containers 322, 332, 342 in the text container 320 portion of the user interface 200.

The text containers portion 320 presents a list of required (or desired) text containers 322, 332, 342 needed to specify text assets required on different operating environments on which the piece of content will be offered. A first text container 322 has a 156×25 px and maximum 28 character constraint 324, includes "Butler helps save Portugal" in text selection area 326, and has a "Complete" status 328. Similarly, a second text container 332 has a 225×25 px and maximum 47 character constraint 334, includes "Butler helps save Portugal in Euro's" in text selection area 336, and has an "Editing" status 338. A third text container 342 has a 95 1×85 px and maximum 20 character constraint 344, includes "Butler saves Portugal" in text selection area 346, and has a "Not Complete" status 338.

An exemplary content application may require different headline lengths such as both a short headline and a long headline. A text editor such as the text editor feature of user interface 200 shown in FIG. 2 could be used to specify these different headlines for the different operating environments upon which the content application will be offered. Sometimes the headlines may be the same and sometimes the headlines may be completely different, such as, for example, a case where one headline says "Butler helped save Portugal in euros," and another one says "Portugal, we're really lucky to win the game."

Generally, certain embodiments provide a headline creation feature that support scalable text content, and in some case the creation of pyramid journalism. For pyramid journalism, a series of different sized fields may be used that enforce the pyramid journalism format. In one example of pyramid journalism, a writer writes a story with a headline that targets a text message on a mobile device having a maximum of 140 characters. The size of the headline and the first paragraph target distributing on TV. The headline, first paragraph, and second paragraph used together target a mobile phone application. In some cases each paragraph could have a constraint in terms of the number of characters and/or words.

Certain embodiments provide a video editing tool that may function, as an example, in a similar manner to the image editor aspect of user interface 200 shown in FIG. 2. For example, a user might edit the video to pick out a portion of a full screen that can be seen on a mobile device. In other cases, a user might have several different videos that were shot at the same time and pick pieces out of each.

Figure 4:
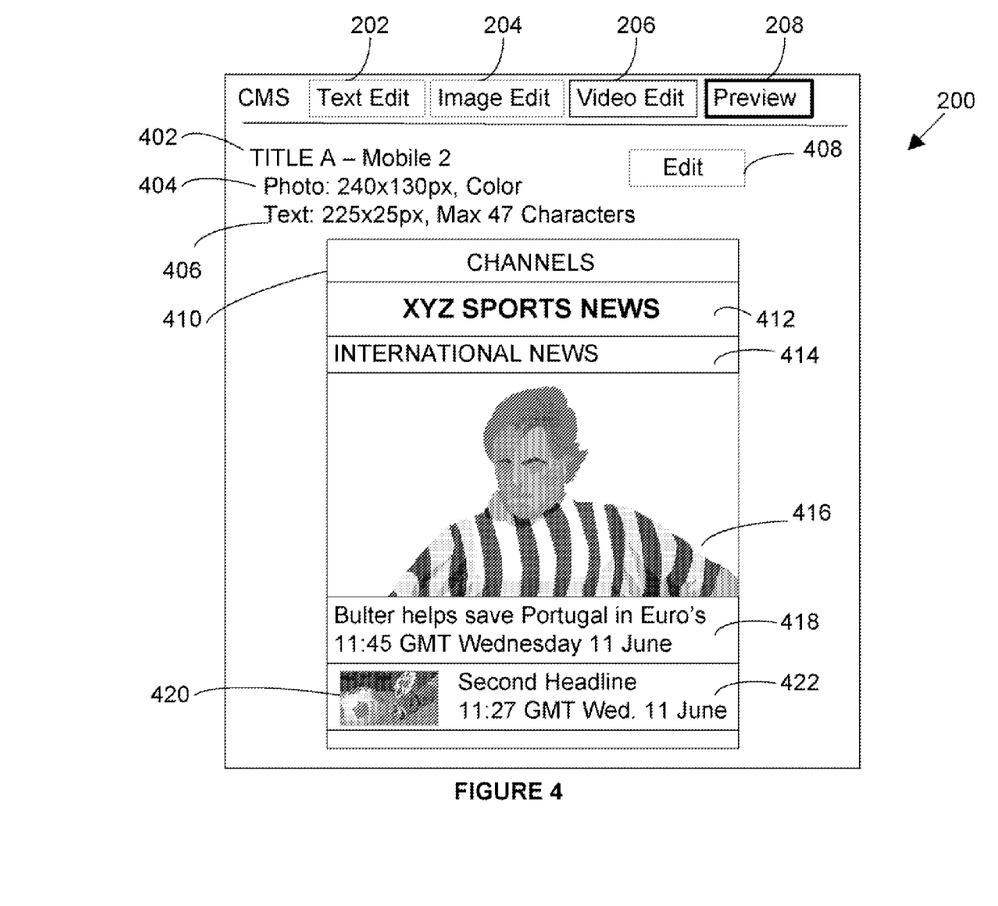
FIG. 4 illustrates another exemplary aspect of the user interface of FIG. 2 according to certain embodiments.

Various embodiments disclosed herein essentially receive container, design, and other types of constraint information and use that information in content creation/editing tools to allow a user to effectively and efficiently identify and preview appropriate content. FIG. 4 illustrates another exemplary aspect of the user interface of FIG. 2 according to certain embodiments. FIG. 4 comprises a title 402, and asset constraint summary information 404, 406 related to specific assets that are previewed for a particular operating environment in preview area 410. An edit button may allow a user to modify a particular asset. For example, if an asset is selected and the edit button 408 is selected, the user interface may launch or switch to an appropriate asset editor, such as an image editor, a text editor, a video editor, etc.

The preview area 410 of FIG. 4 illustrates various parts of a piece of content previewed for a particular operating environment. On this operating environment, the piece of content includes a channel title 412, a subject title 414, an image asset 416, a text asset 418, another image asset 420, and another text asset 422. The ability to preview these assets while creating or otherwise specifying content for provision on multiple operating environments provides numerous advantages and efficiencies. It may also reduce the chances that content will be provided having an unintended appearance on a given operating environment.

Figure 6:
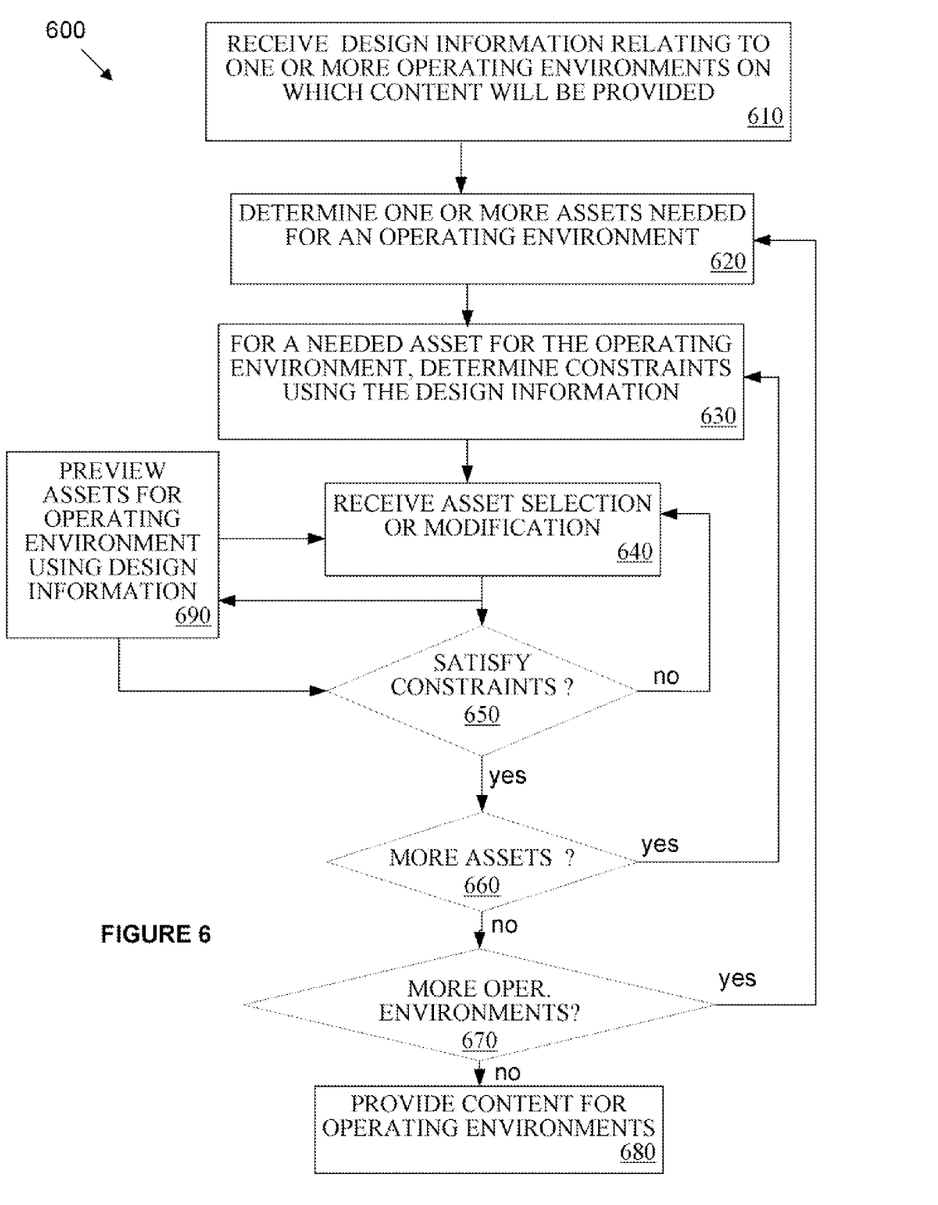
FIG. 6 provides an exemplary method of using design information to specify one embodiment.

FIG. 6 provides an exemplary method 600 of using design information to specify and preview content according to certain embodiments. The exemplary method 600 comprises receiving design information relating to one or more operating environments on which content will be provided, as shown in block 610. For example, a first design may be received for a first operating environment and a second design may be received for a second operating environment. A design may specify the layout, template, or other features of the content when it is provided through or on one or more operating environments. For example, a design may specify the shape, size, and/or position attributes and/or restrictions of various displayed assets, such as graphics, text, video, and other assets.

The method 600 further comprises determining one or more assets needed for an operating environment, as shown in block 620. For example, a design may be interrogated to determine which content assets are needed to satisfy the design. For example, a design may provide a format of a header asset, a format of an item asset, and specify that four item assets are needed. From this, it may be determined that a header asset of the specified format is needed as well as four item assets of the specified item format.

The method 600 further comprises, for a needed asset for the operating environment, determining one or more constraints using the design information, as shown in block 630. For example, the format of a headline, image, or text item asset may specify or be interpreted to specify various requirements or other assets. For example, a text asset may have a maximum number of characters, a minimum number of characters, and/or size requirements or constraints. An image may have size, shape, color, and other constraints. An image may be restricted to a particular size or a particular size range. Generally, constraints may take a variety of forms and specify a variety of requirements depending on the particular circumstances of the system, design, and other variables.

The method 600 further comprises receiving an asset selection or modification as shown in block 640. For example, an image portion may be selected for a given needed asset. In some embodiments, as discussed with respect to FIG. 2, the selection of the image may be guided by or restricted by the constraint information associated with that asset. For example, only an image of a particular size may be accepted as a selection.

In certain embodiments, as shown in FIG. 6, a method involves receiving a selection or modification of an asset as shown in block 640 and then determining whether that selection or modification satisfies constraints imposed on the needed asset, as shown in block 650. If not, the method 600 may return to block 640 to allow a further selection or modification. In the constraints are satisfied, the method 600 may determine whether there are more assets that need to be specified, as shown in block 660, and, if so, return to block 630 to determine constraints to be used in selecting the next asset to be considered.

As shown in decision block 670, if there are no more assets for a given operating environment, method 600 may determine whether there are more operating environments for which asset selections are needed. If there are more operating environments for which asset selections are needed, the method 600 may return to block 620 to determine which assets need to be selected for the next operating environment are to be considered. Once assets have been selected as required for the assets of all of the operating environments, the method 600 provides the selected and otherwise specified assets for use on the operating environments, as shown in block 680. For example, the assets may be sent to a content server, such as the content server 50 shown in FIG. 1, for distribution according to the design to end users using the one or more operating environments to access the content.

In alternative embodiments, content is published for individual operating environments and need not be provided for all operating environments at the same time. In certain embodiments, assets are selected for a single operating environment. In certain embodiments, an asset is selected for use on multiple operating environments based on a single selection of an asset associating the asset with a single asset container that is associated with these multiple operating environments. In certain embodiments, an asset is stored as file, while in other embodiments an asset is simply information, such as coordinates, that allows the asset to be retrieved from a file or other source. For example, different assets may be identified as different portions of a same file. The file may be sent to a content server when the content is published along with the asset information that allows the different assets to be retrieved from the single file. In short, there is a variety of alternative techniques for utilizing design and constraint information to provide assets on one or more operating environments.

Returning to FIG. 6, the method 600 may involve receiving an asset selection or modification as shown in block 640 and then previewing one or more assets for an operating environment using the design information, as shown in block 690. For example, a preview user interface may display the content as it would appear on a given operating environment. One example of such a preview is shown in FIG. 4. A variety of other types of operating environment previews are also possible. In certain embodiments, only certain assets are previewed for a given operating environment. For example, only the image assets for an operating environment may be displayed in a preview. As another example, in some cases only a single asset may be previewed. For example, in one embodiment a preview displays a wireframe of the design for a particular operating environment. A single asset that is being considered or edited may be positioned and displayed in its location within the wireframe display of the content for the operating environment. A variety of alternative preview techniques, methods, and user interfaces are also possible, including both static and interactive preview interfaces.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

Certain embodiments provide techniques for using design and/or constraint information in selecting, editing, or creating content for one or more different operating environments. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown in FIG. 1 as functional or storage components on the respective devices. As is known to one of skill in the art, such applications may be resident in any suitable computer-readable medium and execute on any suitable processor. For example, the devices at environments 10, 20 each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, JavaScript, and Adobe® ActionScript.

While the network 100 shown in FIG. 1 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs. The server devices may be single computer systems or may be implemented as a network of computers or processors. Examples of a server device are servers, mainframe computers, networked computers, a processor-based device, and similar types of systems and devices.

That which is claimed:

1. A system comprising:
a non-transitory computer-readable medium configured to store instructions providing a development application;
a processor configured to execute the instructions stored in the non-transitory computer-readable medium to execute the development application by performing operations comprising:
receiving constraint information relating to one or more images to be used in content provided on one or more operating environments;
providing an image portion selection tool for selecting a portion of an image satisfying one or more constraints for an image imposed for an operating environment;
receiving a selection of an image portion; and
updating selected image portion information based on the selected image portion, the selected image portion information used to provide the content with the selected image portion on the operating environment, wherein versions of the content for different operating environments comprise different image portions according to the selected image portion information.

2. The system of claim 1, wherein the processor is further configured to execute the development application by performing additional operations comprising providing the content on the operating environment, the content comprising the selected image portion.

3. The system of claim 1, wherein the selected image portion information comprises information about multiple image portion selections for use of the content on multiple operating environment.

4. The system of claim 3, wherein the processor is further configured to execute the development application by performing additional operations comprising providing the content on multiple operating environments, wherein versions of the content on different operating environments comprise different image portions according to the selected image portion information.

5. The system of claim 1 wherein the selection of the image portion comprises a selected portion of an image associated with a positioning of the image portion selection tool on the image.

6. The system of claim 1, wherein the selection of the image portion comprises a selected portion of an image associated with an automatic placement of the selection tool determined based on analysis of the content of the image.

7. The system of claim 1, wherein a constraint specifies particular pixel dimensions for an image to be used on a particular operating environment.

8. A non-transitory computer-readable medium on which is encoded program code comprising:
program code for receiving design information relating to one or more operating environments on which content will be provided, the design information comprising a shape, size, or position attribute for one or more assets to be displayed in the content provided on the one or more operating environments;
program code for determining, based on an operating environment, one or more constraints associated with an asset to be displayed in the content provided on the operating environment, the one or more constraints determined using the design information;

program code for receiving an asset selection or modification of the asset, the selection or modification restricted by the one or more constraints associated with the asset; and program code for providing the content for display on the operating environment, the content comprising the asset.

9. The non-transitory computer-readable medium of claim 8, wherein receiving design information comprises receiving a first design for a first operating environment and a second design for a second operating environment.

10. The non-transitory computer-readable medium of claim 8, wherein the one or more assets comprise one or more of graphic assets, text assets, and video assets.

11. The non-transitory computer-readable medium of claim 8, wherein determining one or more constraints using the design information comprises determining a format of the asset.

12. The non-transitory computer-readable medium of claim 11, further comprising program code for identifying multiple assets having a same format.

13. The non-transitory computer-readable medium of claim 11, wherein the asset is text and the format of the asset comprises a maximum number of characters or a minimum number of characters.

14. The non-transitory computer-readable medium of claim 11, wherein the asset is an image and the format of the asset comprises a size.

15. The non-transitory computer-readable medium of claim 11, wherein the asset is an image and the format of the asset comprises a size range.

16. The non-transitory computer-readable medium of claim 8, wherein the asset selection comprises a selection of a portion of an image and a constraint of the one or more constraints specifies the size of the portion of the image.

17. The non-transitory computer-readable medium of claim 8, wherein receiving the asset selection or modification comprises receiving a selection or modification of the asset and determining whether the selection or the modification satisfies the one or more constraints.

18. The non-transitory computer-readable medium of claim 8, further comprising:

program code for using the design information to determine multiple assets for the content for multiple operating environments;

program code for determining associated constraints for the multiple assets on multiple operating environments using the design information; and program code for receiving asset selections or modifications of the multiple assets, the selections or modifications restricted by the constraints associated with the multiple assets.

19. The non-transitory computer-readable medium of claim 8, wherein the asset selection selects a same asset for use on multiple operating environments according to constraints associated with the multiple operating environments determined from the design information.

20. The non-transitory computer-readable medium of claim 8, further comprising program code for previewing the asset selection for the operating environment using the design information.

* * * * *